Aug. 15, 1933.           S. I. VAUGHN            1,922,063
                        MONOCOQUE BODY
                       Filed May 1, 1931
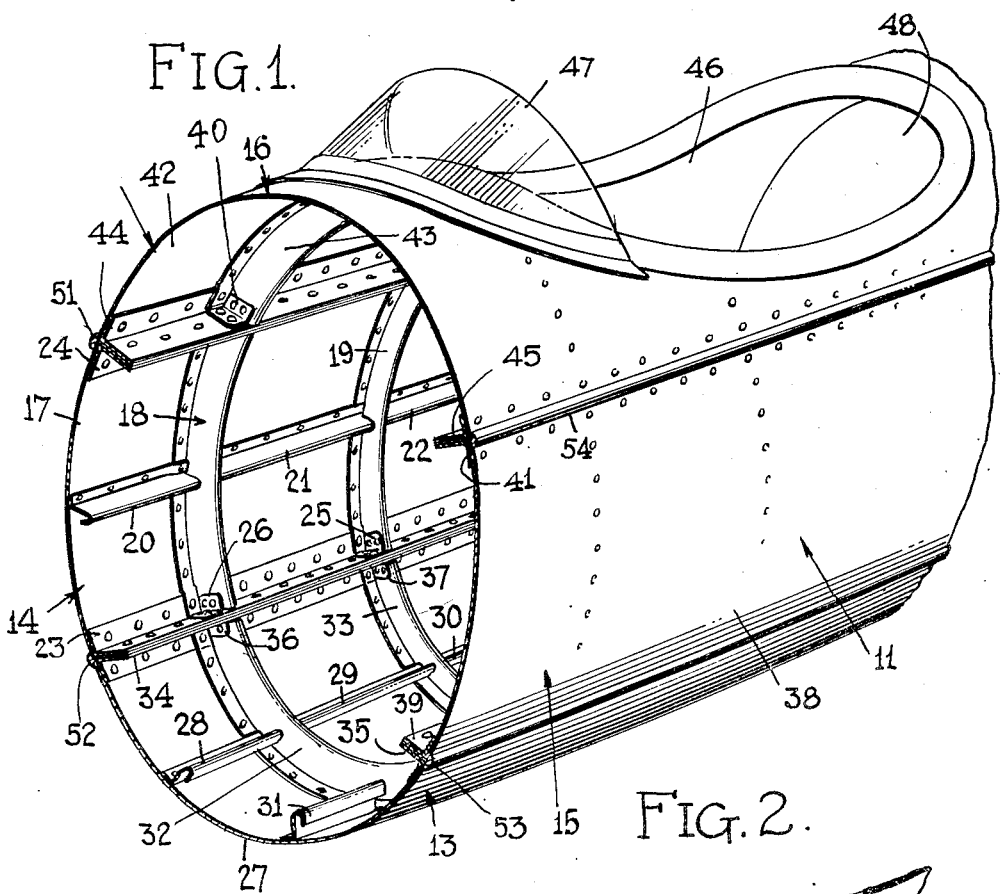
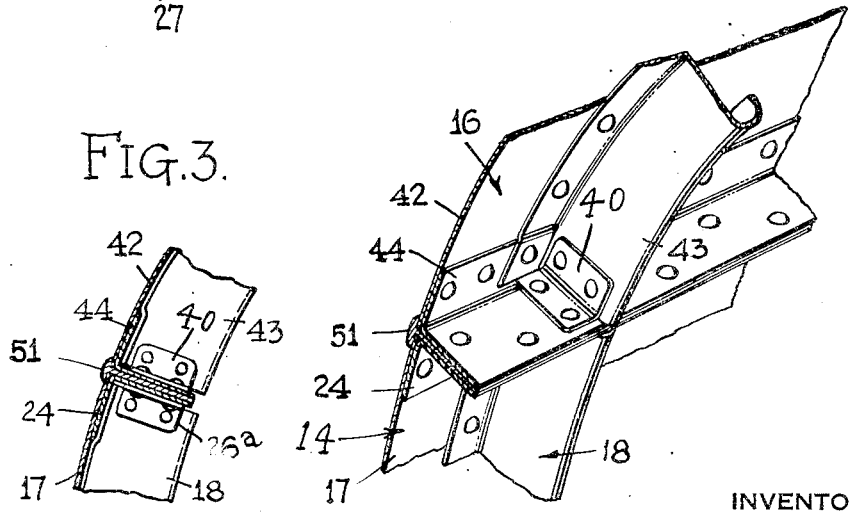
INVENTOR
STANLEY I. VAUGHN.
BY his ATTORNEY Patented Aug. 15, 1933

1,922,063

UNITED STATES PATENT OFFICE 1,922,063

MONOCOQUE BODY

Stanley I. Vaughn, Kenmore, N. Y., assignor to Curtiss Aeroplane & Motor Company, Inc., a Corporation of New York Application May 1, 1931. Serial No. 534,217

2 Claims. (Cl. 244—30)

This invention relates to aircraft bodies and to methods of constructing the same. It is more specifically directed toward the type of bodies for aircraft which are known as metal monocoque fuselages. Usually, in constructing bodies of this kind heretofore, it has been necessary in riveting the body for one operator to work to a large extent from the inside and for another to work from the outside. Obviously, riveting from the inside is especially inconvenient and expensive.

According to the construction described herein, the body which is either elliptical or round in shape, is first assembled in separate sections (four as shown), each of which extends longitudinally throughout the fuselage. Each of these sections is built on an individual jig and then all are set together. Longitudinal flanges secured to each edge of each section are joined to each other to act as longerons (four as shown) and the flanged longitudinal sections are then riveted together to form a complete monocoque body. Spaced arcuate members are joined to each longitudinal section in alignment with similar arcuate members of the adjacent sections and thus form spaced diaphragms. Thus, as may be seen these diaphragms are made in sections (four as shown) but when assembled, the sections of each diaphragm form a complete ring. By means of this design, material is conserved in stamping and there is a further reduction in die cost. Moreover, each section may be completely riveted on an automatic riveting machine separate from each other section, in this way effecting a material decrease in manufacturing costs.

One of the objects of my invention is the design of an aircraft body in which the riveting operation is more accessible than has been heretofore possible.

A further object of the invention is to obtain greater ease in the assembly of an aircraft body of the form specified.

A further object of the invention is the saving of material in the construction of an aircraft body of the form specified.

A further object of the invention is economy in cost of dies for use in constructing an aircraft body of the form specified.

A further object of the invention is to obtain in the construction of such an aircraft body, ease in the application of the interior and exterior finish.

Further objects will be apparent from a reading of the subjoined specification and claims and from a consideration of the accompanying drawing.

In order to explain the invention more clearly, one embodiment thereof is shown in said drawing, in which:

Fig. 1 is a view in perspective of a part of a fuselage of an airplane constructed according to my invention;

Fig. 2 is a view in perspective on a greatly enlarged scale of a detail of one of the joints of the body shown in Fig. 1; and Fig. 3 is a view in section of a part of the structure shown in Figs. 1 and 2.

Referring in detail to the drawing, I have shown a part of a fuselage 11 formed of four longitudinally extending sections. The sections include a bottom section generally designated 13, a pair of side sections generally designated 14 and 15 and an upper section generally designated 16. Inasmuch as the structure of each of these sections and the method of forming them is substantially the same, I will describe only the right side section in full detail.

The right side section 14 is formed of a longitudinally extending cover section or sheet 17 of sheet metal preformed to the shape of the preconceived body design, a plurality of transversely extending longitudinally spaced arcuate diaphragm sections or members such as 18 and 19, a plurality of longitudinally extending angle bracing members interposed between the arcuate diaphragm members such as 20, 21 and 22, a pair of longeron members or longitudinally extending angle plates 23 and 24 which are riveted to the opposite edges of the sheet to form flanges therefor, and a plurality of short corner angle plates such as the plates 25 and 26 and 26ª. The plates 23 and 24 when united to similar flanges on the adjacent sheets form longerons for the fuselage. The short angle plates aid in securing the arcuate diaphragm members to the longitudinally extending angle plates. The angle plates 23 and 24 as shown are substantially coextensive in length with the cover sheet 17 and I preferably construct them so. However, they may, if desired, be made in shorter lengths but it is important that they be longitudinally continuous at their points of intersection with the diaphragm members or sections.

The lower or bottom section 13 includes a longitudinally extending sheet 27, angle bracing members such as 28, 29, 30 and 31, diaphragm members such as 32 and 33, longeron angle plates such as 34 and 35, and short corner angle plates such as 36 and 37. The right hand section 15 includes a longitudinally extending sheet 38, angle bracing members similar to those shown in connection with the other sections, longéron angle plates such as 39 and 41, and short angle plates similar to those shown in connection with the other sections. The upper section 16 includes a longitudinally extending sheet 42, diaphragm members such as 43, angle bracing member similar to those shown in connection with the other sections, longéron angle plates such as 44 and 45, and short corner angle plates such as 40. This latter section has formed therein a cockpit opening 46 and has secured thereto a windshield such as the windshield 47. A seat 48 for an occupant of the plane may be provided if desired.

After the four sections have been fully, though separately formed, they are joined to each other by riveting the upstanding flanges of the longéron members to each other. Thus the longéron member 24 is riveted to the member 44. The longéron member 23 is riveted to the member 34, the longéron member 35 is riveted to the member 39 and the longéron member 41 is riveted to the member 45. I prefer to interpose between the longéron members, the spacer elements 51, 52, 53 and 54 which are formed with rounded heads as shown so as to make the exterior of the fuselage smoother and thus decrease air resistance. It is to be noted that when the fuselage has been completed the diaphragm members cooperate in sets of four aligned members to form a series of spaced rings each extending substantially completely around the fuselage and bracing it. The diaphragm members are, it is true, separated from each other by the longéron members, but this separation does not materially lessen their bracing action. It is to be noted, moreover, that these diaphragm members are interposed between and separate the aligned longitudinally extending bracing members such as 20, 21 and 22.

It should be also understood that each of the sections 13, 14, 15 and 16 is completely assembled separately from each of the other sections. Thereafter the sections 13, 14, 15 and 16 are joined to each other by riveting the flanges of the longéron members to each other. In the operation of joining the sections all except the last section may be joined to the others by riveting machines without the necessity of an operator getting inside of the fuselage. Even in joining the last section, only one operator is required in the riveting operation.

In the process of forming my improved metal monocoque fuselage, I shape the cover sheets such as 17 to the desired form. Thereafter I secure to the cover sheet by rivets the longitudinal bracing members such as 20, 21 and the diaphragm members such as 18 and 19. Then I secure to the edges of the cover section the longéron members or longitudinal angle plates such as 23 and 24. Thereafter, I secure the short angle plates such as 26 and 25 to the diaphragm members and preferably also to the longitudinal angle plates. Two entirely assembled sections are then positioned so that the adjacent flanges substantially contact with each other face to face and the diaphragm sections are aligned with each other end to end. I prefer to interpose between the longitudinal flanges the spacer elements 51, 52, 53 and 54 in order to strengthen the flanges and in order that drag on the outside surface may be lessened. Thereafter the flanges are riveted to each other. During this last operation the short angle plates may be riveted to the longitudinal angle plates if that step has not previously been accomplished. A third completely assembled section is then added in a similar way and subsequently the fourth and final section. In order to rivet the last section, it is necessary that the workman get within the fuselage but no additional workmen outside of the fuselage are required to aid in the riveting operation.

Throughout this application, I have referred to the fuselage as made up of four longitudinally extending sections. It is clear that there could just as well be two, three, five or more sections, and accordingly I desire that the appended claims shall be construed to cover such modifications.

It is to be understood that the above described embodiment of the invention is for the purpose of illustration only, and various changes may be made therein without departing from the spirit and scope of the invention.

What I claim is:

1. The method of constructing metal aircraft bodies of the monocoque type which consists in providing a plurality of sheet metal cover sections; in preforming and shaping the several cover sections so that said cover sections when placed edge to edge will conform, in the aggregate, to the shape of the preconceived body design; in next fitting and fastening to said cover sections at intervals of space longitudinally thereof a plurality of transversely extending diaphragm sections, and along the edges of said cover sections fitting and fastening angle plates which are substantially coextensive with said cover sections; in thereafter so assembling said cover sections edge to edge as to bring the inwardly projecting flanges of the angle plates face to face, and the diaphragm sections which go to make up the completed diaphragms end to end; and in finally uniting the flanges of the angle plates which are face to face and also the diaphragm section ends to provide in the aggregate a rigid monocoque body or shell internally reinforced both transversely and longitudinally.

2. The method of constructing metal aircraft bodies of the monocoque type which consists in providing a plurality of sheet metal cover sections; in preforming and shaping the several cover sections so that said cover sections when placed edge to edge will conform, in the aggregate, to the shape of the preconceived body design; in next fitting and fastening to said cover sections at longitudinally spaced intervals a plurality of transversely extending diaphragm sections, and along the longitudinal edges of said cover sections fitting and fastening angle plates which are substantially coextensive with said cover sections and which at their points of intersection with the diaphragm sections are longitudinally continuous; in next uniting the ends of the diaphragm sections with the angle plates extended thereacross; in thereafter so assembling said cover sections edge to edge as to bring the inwardly projecting flanges of the angle plates face to face and the diaphragm sections which go to make up the completed diaphragms end to end, and in finally uniting the flanges of the angle plates which are face to face and also the diaphragm section ends so as to provide in the aggregate a rigid monocoque body or shell internally reinforced both transversely and longitudinally.

STANLEY I. VAUGHN.